(12) United States Patent
Haas et al.

(10) Patent No.: US 10,442,480 B2
(45) Date of Patent: Oct. 15, 2019

(54) COATING FOR SEAL ASSEMBLY

(71) Applicant: Caterpillar Inc., Peoria, IL (US)

(72) Inventors: Connor J. Haas, Peoria, IL (US); John M. Spangler, Peoria, IL (US); Anca I. Marcu, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 180 days.

(21) Appl. No.: 15/639,015

(22) Filed: Jun. 30, 2017

(65) Prior Publication Data

US 2019/0002044 A1 Jan. 3, 2019

(51) Int. Cl.
| | |
|---|---|
| *B62D 55/088* | (2006.01) |
| *B62D 55/15* | (2006.01) |
| *B22F 5/10* | (2006.01) |
| *B62D 55/32* | (2006.01) |
| *F16C 33/74* | (2006.01) |
| *C09D 7/61* | (2018.01) |
| *C23C 18/12* | (2006.01) |
| *C23C 28/00* | (2006.01) |

(52) U.S. Cl.
CPC .......... *B62D 55/0887* (2013.01); *B22F 5/106* (2013.01); *B62D 55/15* (2013.01); *B62D 55/32* (2013.01); *C09D 7/61* (2018.01); *C23C 18/1254* (2013.01); *C23C 28/00* (2013.01); *F16C 33/74* (2013.01)

(58) Field of Classification Search
CPC .... B62D 55/0887; B62D 55/32; B62D 55/15; C09D 7/61; F16C 33/74; B22F 5/106
USPC .......................................................... 305/100
See application file for complete search history.

(56) References Cited

U.S. PATENT DOCUMENTS

| | | | | |
|---|---|---|---|---|
| 5,207,840 | A | * | 5/1993 | Riesop .................. C23C 22/188 148/260 |
| 6,548,573 | B1 | | 4/2003 | Rempert |
| 6,951,559 | B1 | * | 10/2005 | Greep ..................... A61B 18/14 606/41 |
| 9,822,883 | B2 | * | 11/2017 | Antoine ............... B62D 55/088 |
| 2009/0011222 | A1 | | 1/2009 | Xiu et al. |
| 2010/0324205 | A1 | | 12/2010 | Maier et al. |
| 2011/0285091 | A1 | * | 11/2011 | Wodrich ................ B22D 19/08 277/377 |
| 2015/0322272 | A1 | * | 11/2015 | Pokroy .................. A01N 29/02 428/141 |
| 2016/0176454 | A1 | | 6/2016 | Diekevers et al. |
| 2016/0369896 | A1 | | 12/2016 | Thorson et al. |
| 2017/0152951 | A1 | * | 6/2017 | Antoine ............... B62D 55/088 |

* cited by examiner

*Primary Examiner* — S. Joseph Morano
*Assistant Examiner* — Jean W Charleston

(57) ABSTRACT

A seal having a body defining an inner surface and an outer surface. The seal includes a layer of coating deposited on the body, the layer of coating including a material exhibiting oleophobic and hydrophobic properties for both the inner surface and the outer surface.

16 Claims, 10 Drawing Sheets

COATING FOR SEAL ASSEMBLY

TECHNICAL FIELD

The present disclosure generally relates to seal assemblies. More particularly, the present disclosure relates to coatings for a seal ring of a seal assembly.

BACKGROUND

Seal assemblies are generally used to seal a first machine part relative to a second machine part. The seal assemblies may include elastomeric/rubber components and seal rings. The seal rings and elastomeric components may be exposed to oil, mud, and/or water based substances. For example, seal assemblies applied in an endless track of a work machine may be exposed to oil/lubricant. Because of such exposure, the elastomeric components may absorb oil which may lead to accelerated aging/degradation of the elastomeric components, thereby shortening seal life. Further, some elastomeric components like silicone, may also "sweat" (i.e. release oil) causing reduced frictional forces to develop between adjoining components (for example, elastomeric components and seal rings), which may cause the elastomeric components to become displaced.

Additionally, during operation of the work machine on a ground surface, mud/earthen materials may cling to the track assembly and/or to components of the seal assemblies. The mud/earthen materials may forcibly enter into such seal assemblies and may displace the elastomeric components, causing gaps to develop, thereby causing oil leaks and subsequent failures. Moreover, due to the oil leakage the seal ring may be covered by oil. Hard abrasives from the mud earthen materials may stick/cling to the oil on the metal seal ring and may accelerate wear.

US 2015/0322272 (hereinafter referred to as "272") discloses a method of forming a surface. The formed surface exhibits hydrophobic and oleophobic properties (i.e., repels oil and water based substances) for biofilm applications. The "272" reference, however, does not take into account the harsh and environmental conditions of the present disclosure.

SUMMARY OF THE INVENTION

In an aspect of the present disclosure, a seal is disclosed. The seal includes a body defining an inner surface and an outer surface. The seal further includes a layer of coating deposited on the body, the layer of coating including a material exhibiting oleophobic and hydrophobic properties for both the inner surface and the outer surface.

In another aspect of the present disclosure, a seal assembly is disclosed. The seal assembly includes a seal ring defining an outer circumferential surface and an inner circumferential surface. The seal assembly also includes a layer of coating deposited on the outer circumferential surface and the inner circumferential surface, the layer of coating including a material exhibiting oleophobic and hydrophobic properties.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts.

Figure 1:
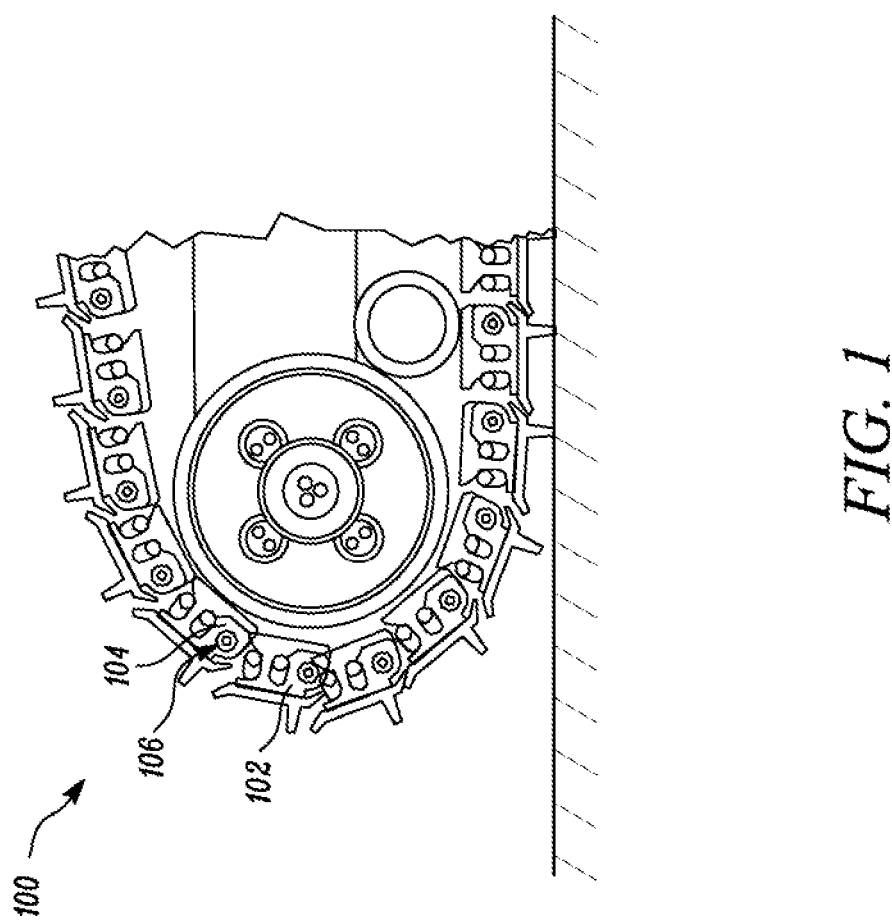
FIG. 1 is a portion of an exemplary endless track of a work machine, in accordance with an aspect of the present disclosure.
Figure 2:
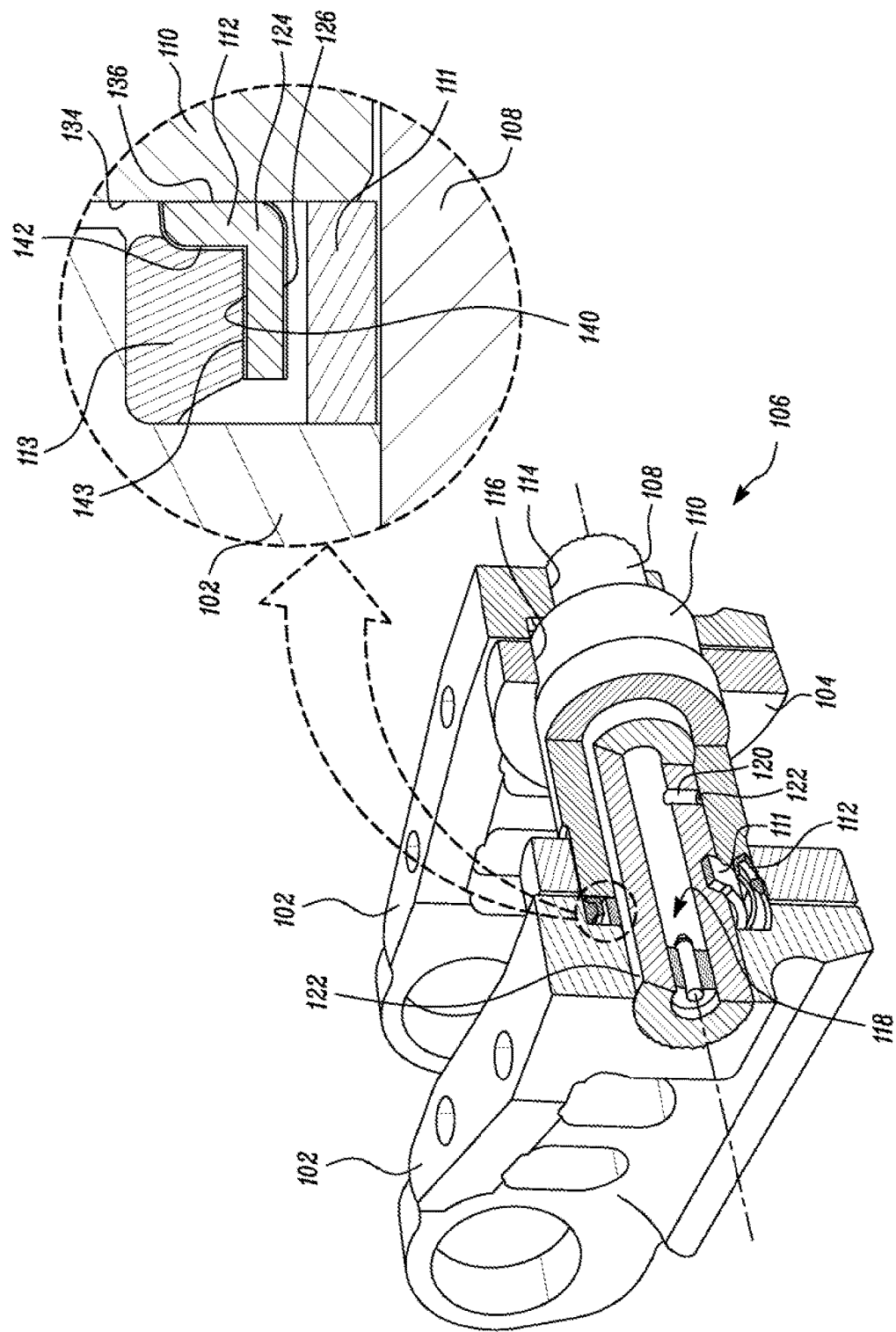
FIG. 2 is a sectional view of a first pair of links and a second pair of links of the endless track and an exemplary seal applied within the endless track, in accordance with an aspect of the present disclosure.

Referring to FIG. 1, an exemplary environment and an application area of one or more aspects of the present disclosure is shown. FIG. 1 illustrates an exemplary endless track 100 of a work machine (not shown), with certain surrounding components of the endless track 100 removed. The work machine may include an excavator, a dozer, a dragline, an autonomous machine, a semi-autonomous machine, a tractor, a truck, etc. The endless track 100 may be a traction device, applied by an undercarriage of the work machine, that facilitates a movement of the work machine. The endless track 100 includes a plurality of pair of links, for example a first pair of links 102 and a second pair of links 104. The first pair of links 102 and the second pair of links 104 are pivotally coupled to each other through a joint assembly 106, as illustrated in FIG. 2. The first pair of links 102 and the second pair of links 104 may be mechanically coupled to adjacent fore and aft pair of links. When an appropriate number of the pair of links are connected together, the endless track 100 is formed (as shown in FIG. 1).

The joint assembly 106 includes a pin 108, a bushing 110, and seal 112. The pin 108 may be received in a first bore 114 formed within the first pair of links 102 and may be fixedly coupled (for example, by press-fitting) with the first pair of links 102. The bushing 110 may be received in a second bore 116 formed within the second pair of links 104 and may be fixedly coupled (for example, by press-fitting) with the second pair of links 104. In assembly, the pin 108 may be positioned within a hollow cavity of the bushing 110, and may be rotatable relative to the bushing 110. Such a configuration enables the first pair of links 102 to be rotatable/pivotable relative to the second pair of links 104. The pin 108 may include a reservoir 118 that houses a lubricant/oil/friction reducing fluid. Further, the pin 108 may include a port 120 configured to serve as an outlet passage for the lubricant to travel from the reservoir 118 to an interface 122 defined between the pin 108 and the bushing 110. A presence of the lubricant at the interface 122 enables the pivotal rotatable movement between the pin 108 and the bushing 110.

Referring to FIG. 2, the seal 112 may be concentrically disposed about the pin 108, with a thrust ring 111 arranged in between the pin 108 and the seal 112, following a general practice of the art. A load ring 113 may be concentrically disposed between the seal 112 and the first pair of links 102. In the embodiment illustrated, one seal 112 is shown, although it may be contemplated that more than two seals similar to seal 112 may be installed within the joint assembly 106, preferably on axially opposing sides of pin 108/bushing 110.

Figure 3:
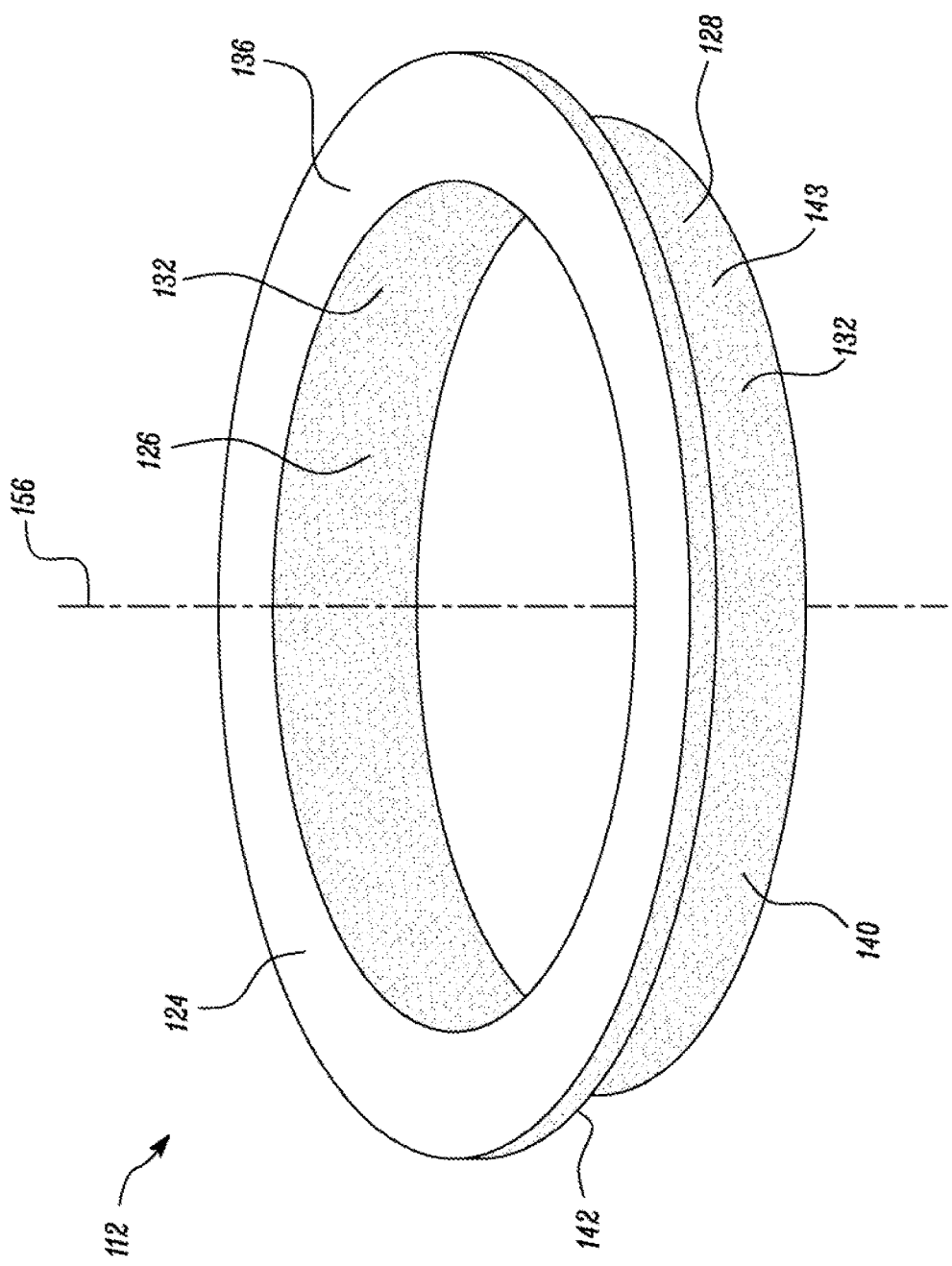
FIG. 3 is a perspective view of the seal, in accordance with an aspect of the present disclosure.

Details of the seal 112 in the joint assembly 106 will now be explained in detail with reference to FIG. 2 and FIG. 3. The seal 112 includes a body 124. The body 124 defines an inner surface 126 and an outer surface 128. In the embodiment illustrated, the body 124 is a ring that defines the inner surface 126 in the form of an inner circumferential surface and the outer surface 128 as an outer circumferential surface.

The outer surface 128 of the seal 112 may include a first section 140 and a second section 142. The first section 140 may extend parallel to the axis 156 of the body 124 (as shown in FIG. 3). The second section 142 may extend laterally along the axis 156, to impart a substantially hat-shaped structure to the seal 112—although other seal designs/shapes may be possible. In one embodiment, an angle between the first section 140 and the second section 142 may be 90°. In an alternate configuration, angle between the first section 140 and the second section 142 may be greater or lesser than 90°. For example, in one implementation, the angle may take a value in a range of 90° to 110°.

The body 124 may further include a contact surface 136 extending perpendicularly to the axis 156 between the inner surface 126 and the outer surface 128. The contact surface 136 may be adapted to sealingly interact with an end face 134 of the bushing 110. The contact surface 136 of the seal 112 may be configured to abut the end face 134 of the bushing 110 when the seal 112 is disposed about the pin 108 (as shown in FIG. 2).

The seal 112 further includes a layer of coating 132 that is deposited on at least a portion of the body 124. For example, the layer of coating 132 may be deposited on the inner surface 126. In an alternate example, the layer of coating 132 may be deposited over both the inner surface 126 and the outer surface 128. In yet another embodiment, the layer of coating 132 may be deposited over the entire surface area of body 124. In the embodiment illustrated in FIG. 3, the layer of coating 132 is deposited on both the inner surface 126 and the outer surface 128. The layer of coating 132 is made up of a material that exhibits hydrophobic and oleophobic properties i.e. repels oil and water. For example, the layer of coating 132 may be made up of/may include one of a fluorocarbon based material (for example: tri-functional perfluoroalkyl acrylate oligomer, perfluoropolyether poly-acrylate, etc.), hydrocarbon based materials (for example: aluminum oxide nano-particles coated with modified carboxylic acids), ceramic coatings, sol-gel etc.

A portion of the layer of coating 132 that is deposited over the outer surface 128, i.e. over the first section 140 and the second section 142, forms a load ring receiving surface 143, as shown in FIG. 2. The load ring 113 is disposed on the load bearing receiving surface 143. As shown in FIG. 2, the first pair of links 102 is disposed on the load ring 113. The load ring 113, in such a configuration, is sandwiched between the first pair of links 102 and the load bearing receiving surface 143. The load ring 113 may be configured to force the seal 112 to sealingly engage with the pin 108 and/or the bushing 110.

The seal 112 is placed such that a portion of the layer of coating 132 disposed over the inner surface 126 of the body 124 seals the interface 122 from receiving any outside contaminants. Since, the layer of coating 132 disposed over the inner surface 126 of the body 124 has oleophobic nature/properties any oil that clings to the layer of coating 132 is repelled back to the interface 122. Thus, the layer of coating 132 acts as a shield against oil/lubricant thereby reducing the probability of leakage of oil/lubricant from inside the joint assembly 106.

Further, the seal 112 is positioned between the pin 108 and the bushing 110 such that the portion of the layer of coating 132 (exhibiting oleophobic and hydrophobic properties) disposed over the outer surface 128 seals the interface 122 from environmental substrates i.e. moisture, mud and other water based debris. Since, the layer of coating 132 disposed over the outer surface 128 of the body 124 has oleophobic and hydrophobic nature/properties moisture, mud and other water based debris that cling to the layer of coating 132 are repelled back to environment surrounding the endless track 100. Thus, the layer of coating 132 acts as a shield against moisture, mud and other water based debris thereby reducing the probability of moisture, mud and other water based debris from accumulating on the seal 112. Thereby, preventing or delaying the build-up of the mud/debris that may eventually displace the load ring 113 and cause failure/improper functioning of the joint assembly 106.

Figure 4:
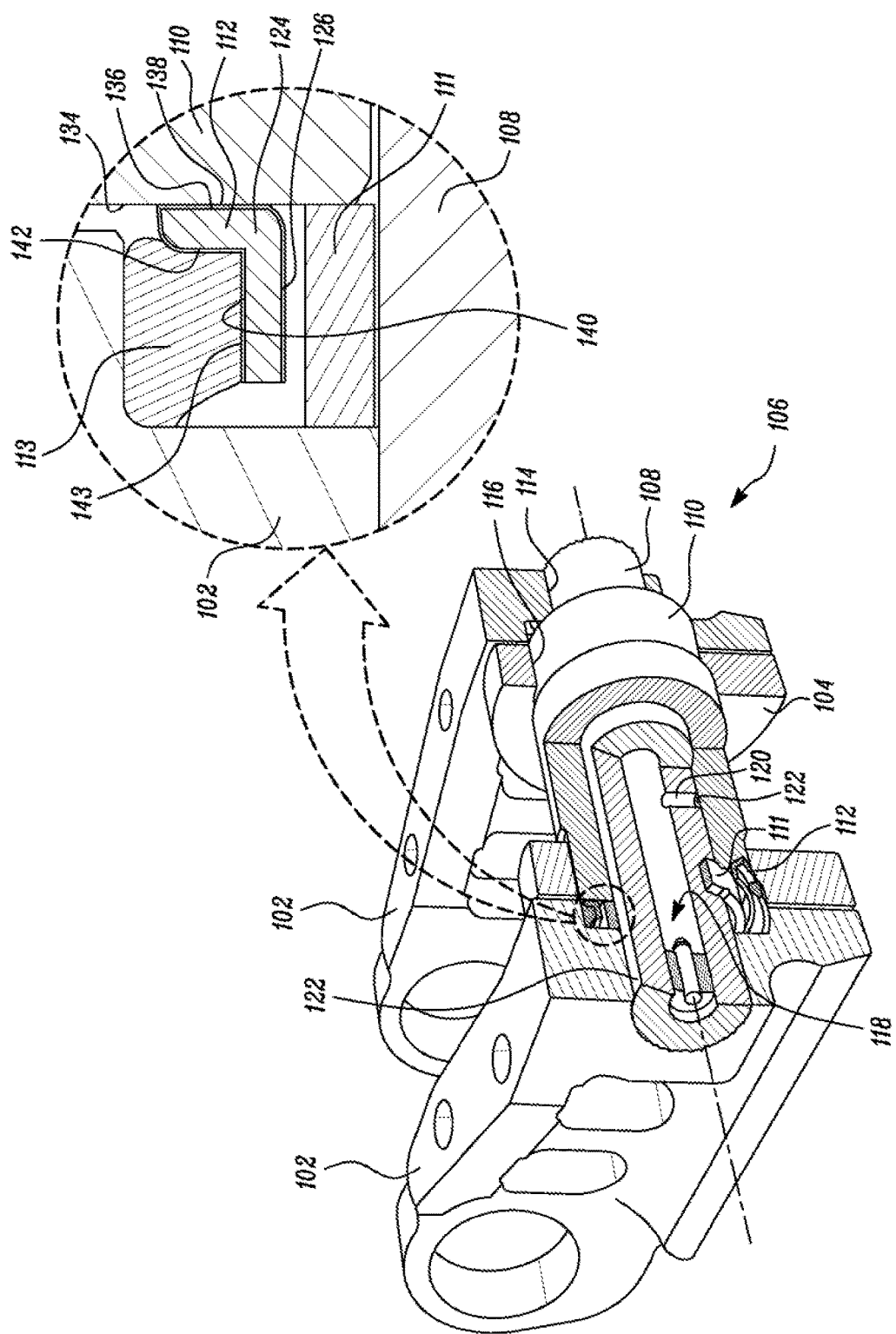
FIG. 4 is a sectional view of the first pair of links and the second pair of links of the endless track and an exemplary seal applied within the endless track, in accordance with an alternate aspect of the present disclosure.

In an embodiment, as illustrated in FIG. 4, the contact surface 136 may also be covered by the layer of coating 132. In such a configuration, a portion of the layer of coating 132 deposited over the contact surface 136 forms the sealing surface 138. In the embodiment illustrated, the sealing surface 138 of the seal 112 may be disposed on the thrust ring 111 and/or pin 108 and abutting the end face 134 of the bushing 110. In an alternate embodiment, the sealing surface 138 may sealingly and slidably engage against the end face 134 of the bushing 110 to rotate relative to the end face 134 of the bushing 110. In various other embodiments, it may be possible that the sealing surface 138 may be movable (or slidable) against other surrounding components of the endless track 100, as well. Additionally, the sealing surface 138, may be flat surface. In some implementations, however, the sealing surface 138 may include a curved shape its well. A shape of the sealing surface 138 may be selected based on a profile of the end face 134 of the bushing 110, or any other suitable, well known factors associated with conventional seals, such as a heat of operation of seals, etc.

Figure 5:
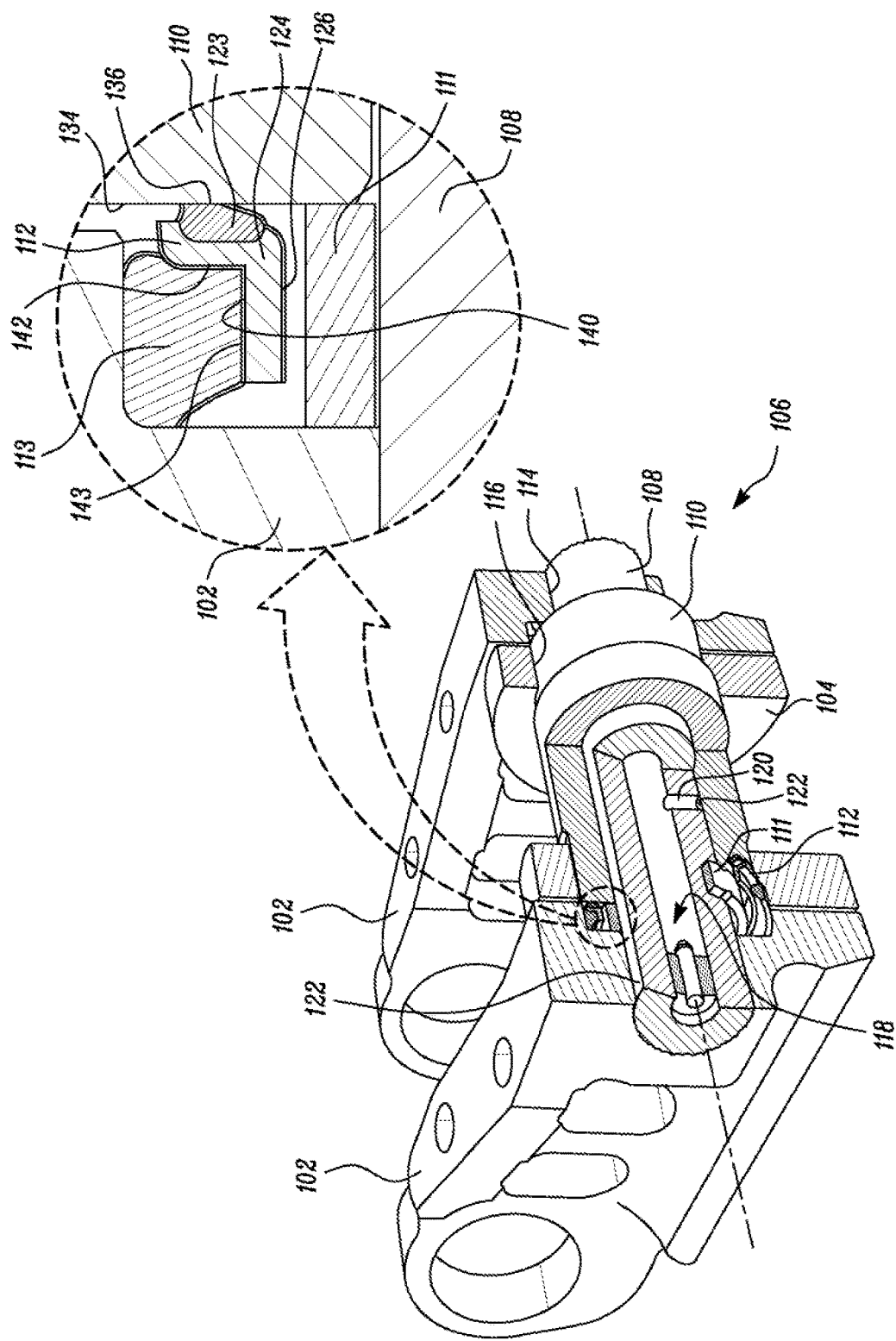
FIG. 5 is a sectional view of the first pair of links and the second pair of links of the endless track and an exemplary seal applied within the endless track, in accordance with yet another aspect of the present disclosure.

In an alternate embodiment, as illustrated in FIG. 5, the joint assembly 106 may further include a sealing lip 123. The sealing lip 123 may be fabricated from a suitable sealing material such as an elastomeric material including a polyurethane compound, for example. The sealing lip 123 may be positioned adjacent the seal 112 such that the load ring 113 acts upon the seal 112 to urge the sealing lip 123 in an axial direction i.e. along the axis 156 of the body 124 against the end face 134 of the bushing 110. Such a configuration ensures sealing engagement of the sealing surface 138/contact surface 136 with the bushing 110.

Figure 6:
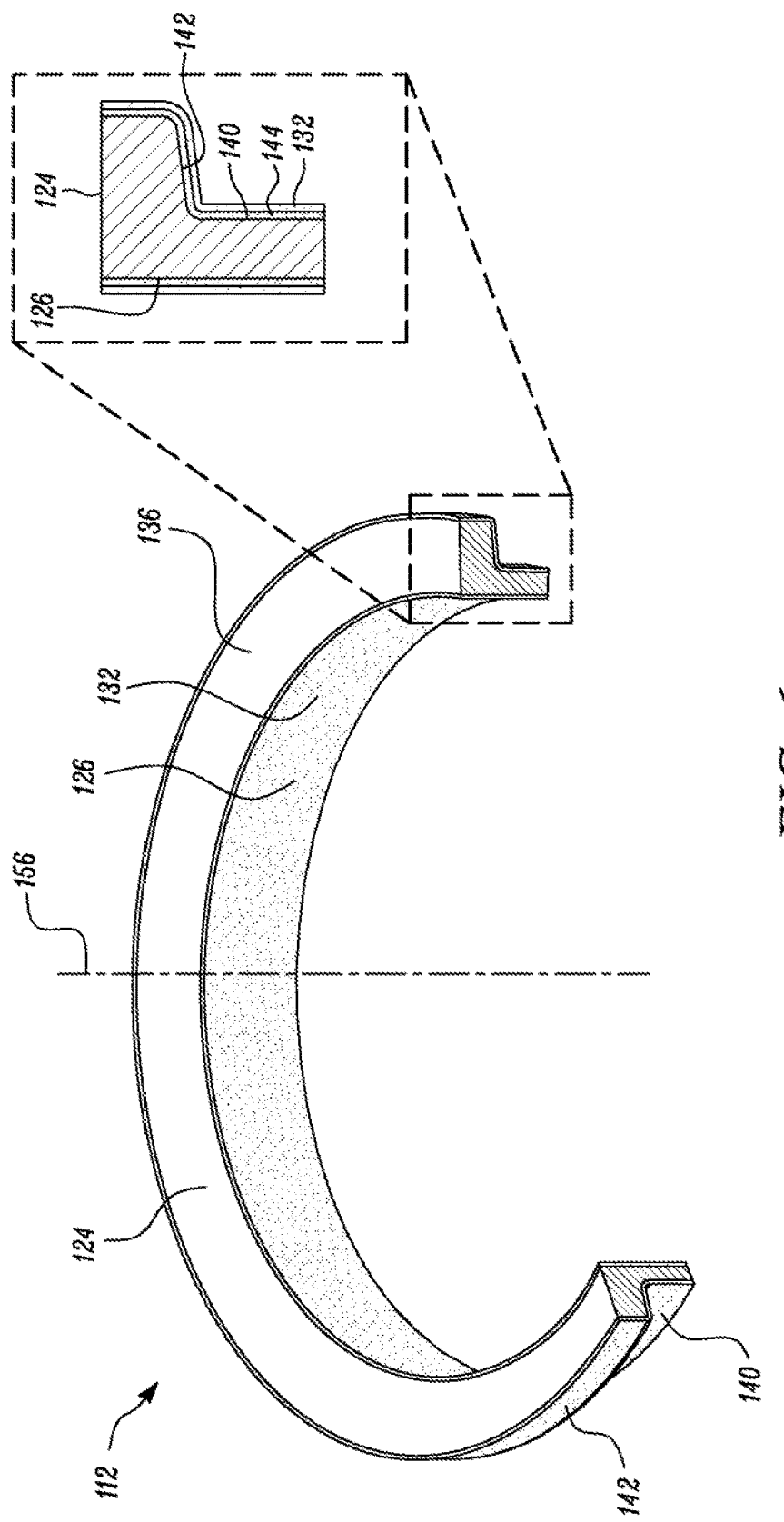
FIG. 6 illustrates a perspective view and a sectional view of the seal, in accordance with an aspect of the present disclosure.

In an embodiment, as illustrated in FIG. 6, a second layer of coating 144 (generally referred to as base coating) may be deposited on the body 124 of the seal 112 prior to the layer of coating 132 being applied to the body 124. For example, the inner surface 126 and/or outer surface 128 of the body 124 may be coated with the second layer of coating 144. Over the second layer of coating 144, the layer of coating 132 (hereinafter interchangeably referred to as first layer of coating 132) is deposited. Thus, the second layer of coating 144 lies between the first layer of coating 132 and the inner surface 126. Further, the second layer of coating 144 also lies between the first layer of coating 132 and the outer surface 128 of the body 124. The second layer of coating 144 may be made up of/may include a coating made of one of zinc, manganese phosphate etc. In an embodiment, the second layer of coating 144 may correspond to the body 124 being painted with a colored substance which is subsequently dried to leave a thin decorative or protective coating. In an embodiment, the second layer of coating 144 may correspond to a layer of primer material applied on the entire surface of the body 124 or on a portion of the body 124 (for instance, inner surface 126 and outer surface 128). In an embodiment, the second layer of coating 144 may be a coating made of a material that offers corrosion protection to the surface of the seal 112 (for example, the second layer of coating 144 may correspond to a layer of paint, primer, plating, sealant, top coat, etc.). In an embodiment of the present disclosure, a layer of powder may be disposed over the inner surface 126 and outer surface 128 of the seal 112. The layer of powder may then be heated to fuse into a protective layer to form the second layer of coating 144. In an embodiment, the fused powder may be directly applied on the inner surface 126 and outer surface 128 to form the second layer of coating 144. It may be contemplated that the second layer of coating 144 may be applied only on the surface of the metallic components. It may, further, be contemplated that the second layer of coating 144 may not be required on a surface of a non-metallic component. Thus, the surface of the non-metallic components may only have the first layer of coating 132.

In some implementations, the layer of coating 132 may have a predefined maximum thickness value. For example, the layer of coating 132 may have a maximum thickness of 20 μm i.e. $20 \times 10^{-6}$ meters.

In an embodiment, as illustrated in FIG. 4, the layer of coating 132 may also be deposited on the elastomeric components used in the joint assembly 106. For example, the load ring 113 and/or the sealing lip 123 may be coated with the layer of coating 132. The presence of the layer of coating 132 (exhibiting oil and water repelling properties) on the load ring 113 and/or the sealing lip 123 may prevent oil/water based substances from sticking/adhering to surface of the elastomeric components (i.e. the surface of the load ring 113 and/or sealing lip 123). This obviates oil causing reduced frictional forces to develop between adjoining components. Thus, the layer of coating 132, as disclosed herein, reduces the probability of failure of the adjoining components. In the embodiment illustrated, the load ring 113 is an elastomeric/rubber component having the layer of coating 132 on it. However, in an alternate embodiment the load ring/load generator 113 may be made of a metallic material and may have the layer of coating 132 disposed over the metallic load ring/load generator 113.

In an embodiment, the layer of coating 132 applied over the seal 112, the load ring 113 and/or the sealing lip 123 may be flexible, having a low coefficient of friction and moldable. Such properties of the layer of coating 132 may aid in assembling the endless track 100. For example, the layer of coating 132 may be applied to the components of the joint assembly 106 (i.e. one or more of the thrust ring 111, seal 112, the load ring 113 and/or the sealing lip 123). During the initial stages, the applied/deposited layer of coating 132 may be in a soft/unsettled/moldable form. Further, just after deposition of the layer of coating 132 (i.e. during the initial stage) on the components of the joint assembly 106, the layer of coating 132 may exhibit some wetness and a low coefficient of friction. Such properties help the components to slide relative to each other during assembly. When these parts dry or are dried, the coefficient of friction increases and the joint assembly 106 has the additional benefit of repelling water and oil.

Although the seal 112 is shown in relation to the joint assembly 106 in the endless track 100 of the work machine, the seal 112 of the present disclosure may be used in different applications, such as in different machine components or various machines. For example, the seal 112 and/or various aspects of the seal 112 discussed in this disclosure may be used in components including pumps, augers, scrapers, axles, skidders, backhoes shovels, classifiers, ski lifts, tractors, conveyors, transporters, drill rigs, tunneling machines, graders, wagons, haulers, railway equipment, loaders, axles, final drive applications, wheel applications, and similar components. In one implementation, the seal 112 may represent a seal ring of mechanical face seal for example, a Duo-Cone™ seal, as produced by Caterpillar Inc, Heavy Duty Dual Face (HDDF), SMR, etc. In one implementation, the seal 112 may correspond to a seal ring of a metal face seal assembly and/or elastomeric face seal assembly.

Figure 7:
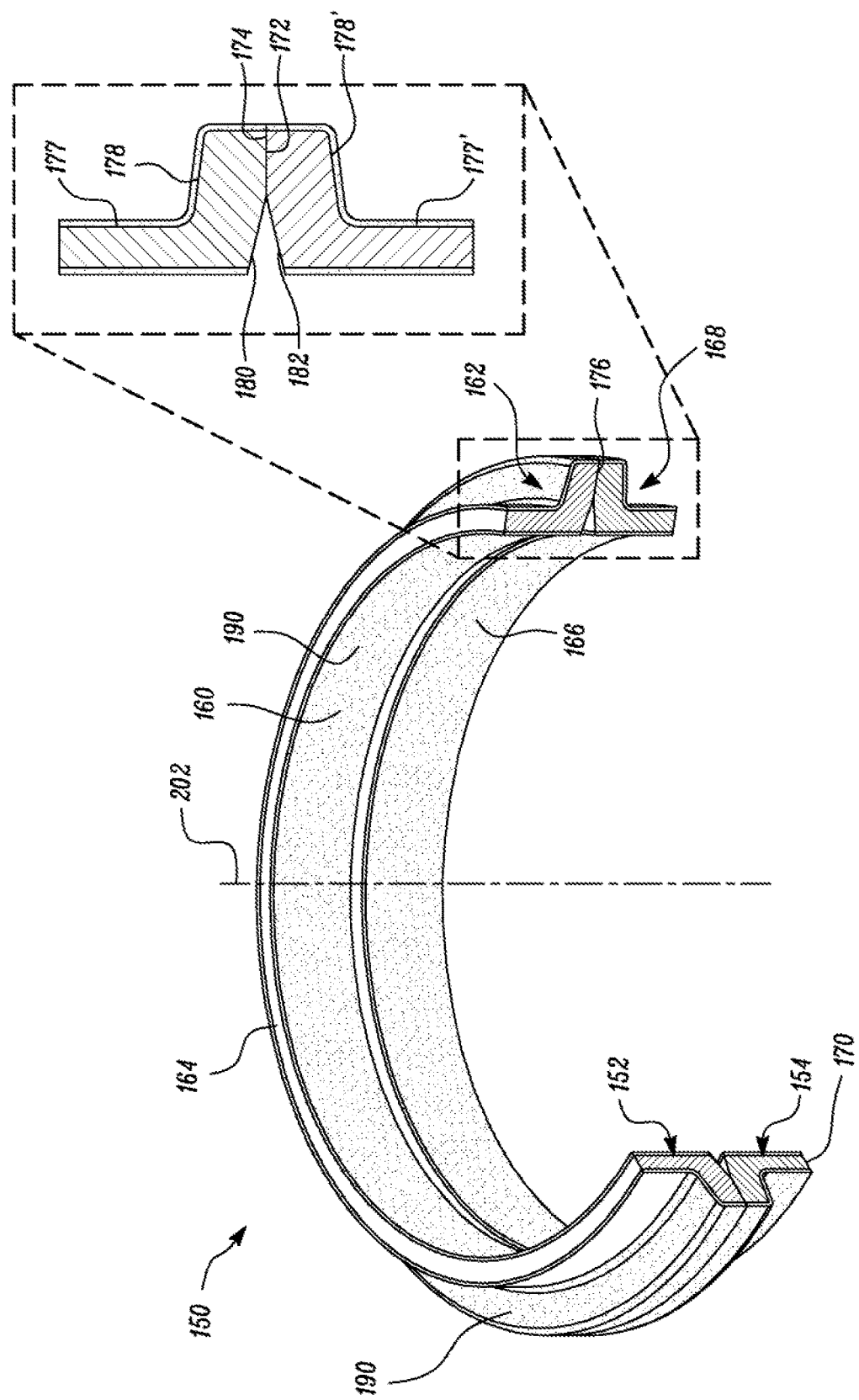
FIG. 7 illustrates a seal assembly, in accordance embodiment of the present disclosure.
Figure 8:
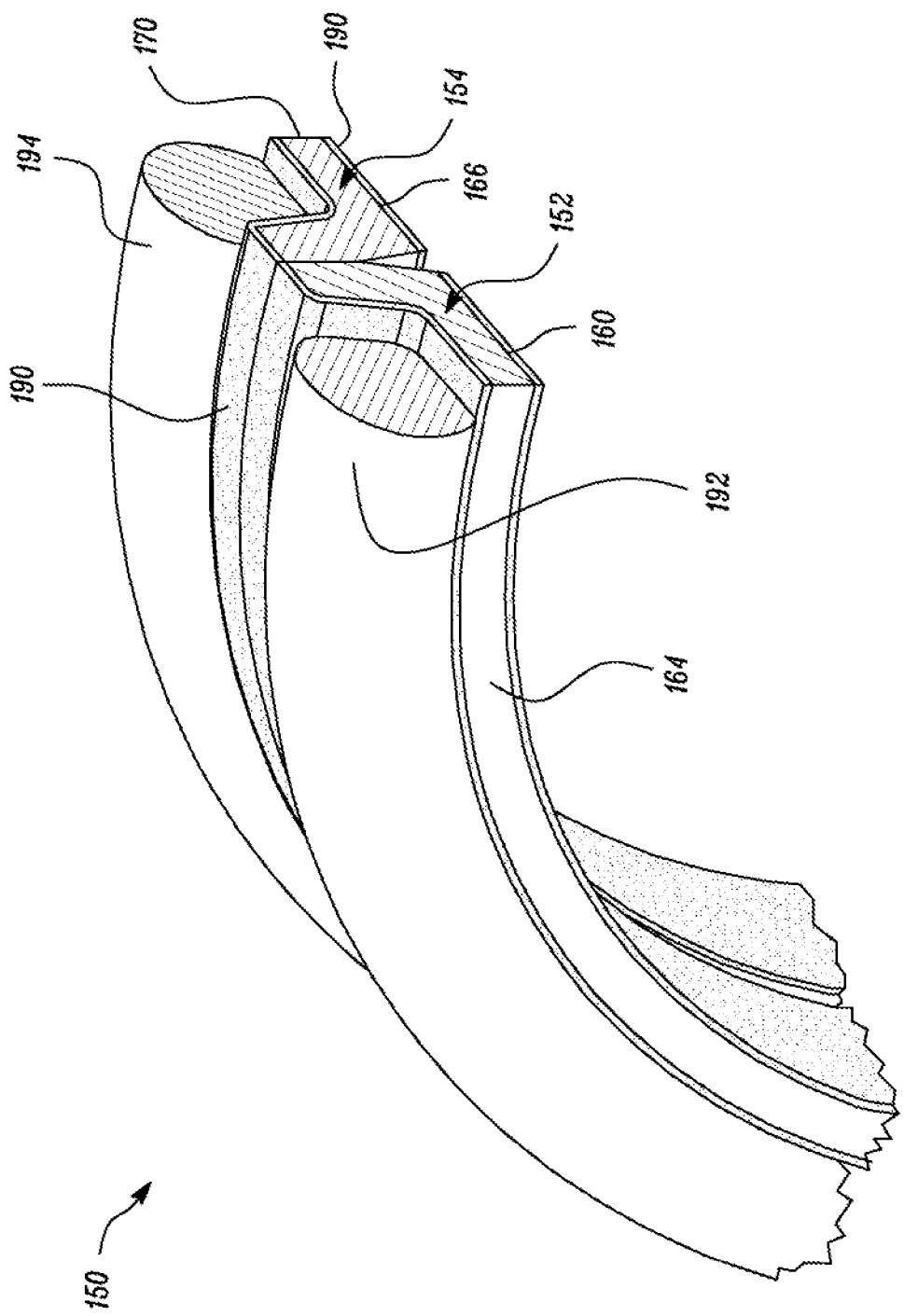
FIG. 8 illustrates a perspective view of as portion of the seal assembly, in accordance with an embodiment of the present disclosure.
Figure 9:
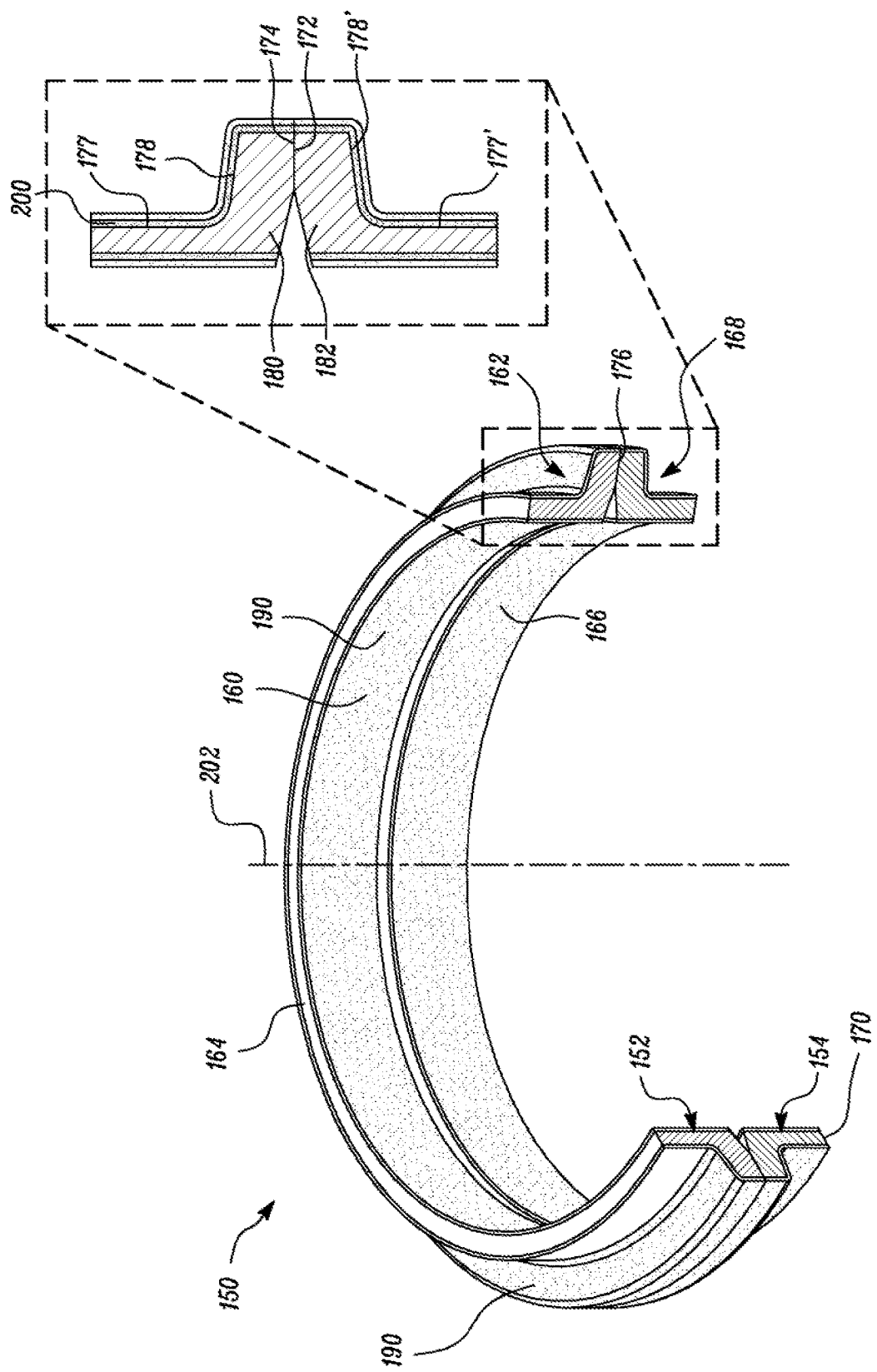
FIG. 9 illustrates the seal assembly, in accordance with an embodiment of the present disclosure.
Figure 10:
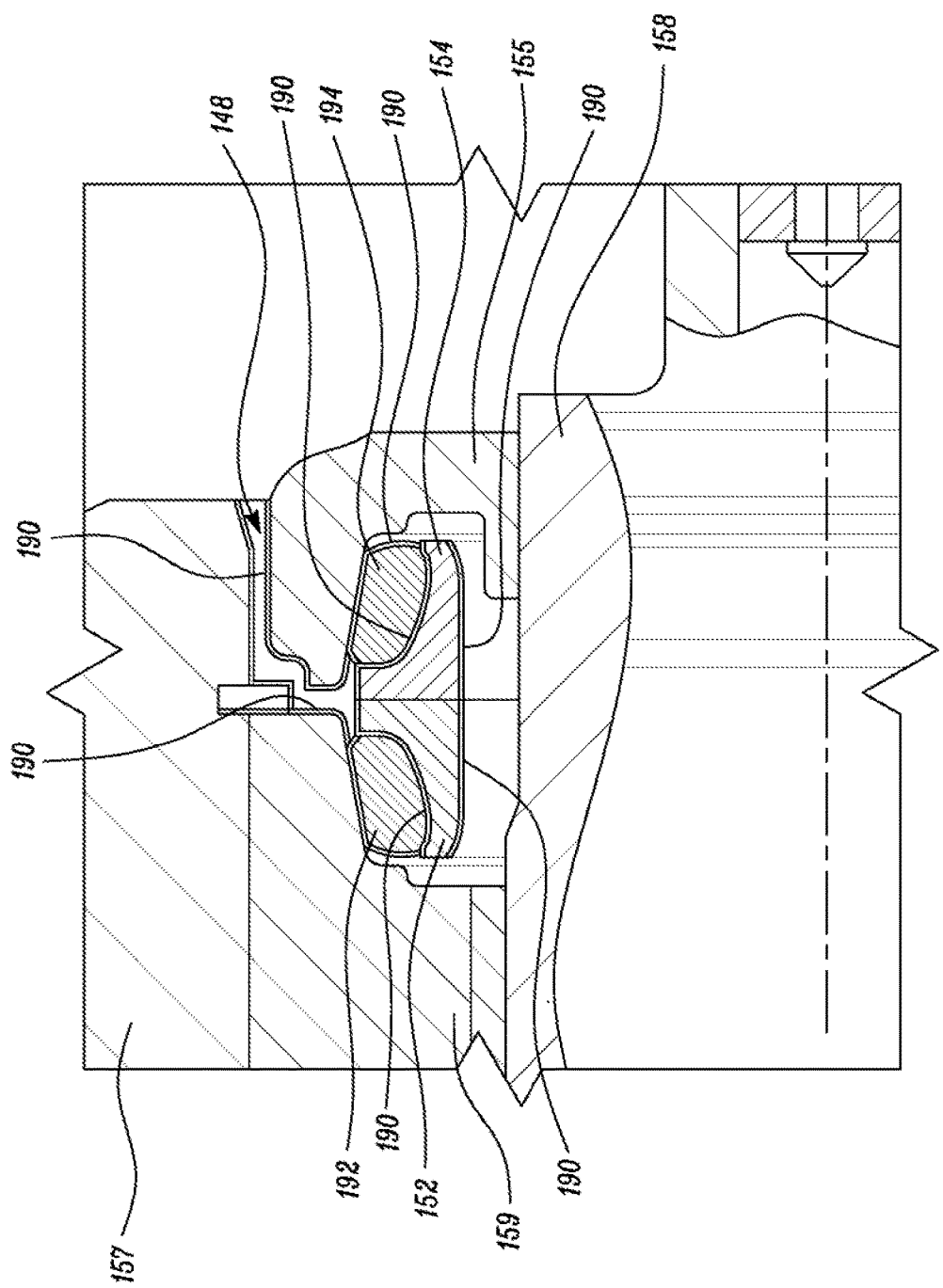
FIG. 10 illustrates the seal assembly applied between a movable machine part and a stationary machine part, in accordance with an embodiment of the present disclosure.

For example, FIG. 7-10 illustrates a seal assembly 150. The seal assembly 150 may include one or more seal rings (similar to the seal 112, as disclosed above) that may be used in various types of machines. For example, the seal assembly 150 may include a stationary seal ring 154, and a movable seal ring 152, as illustrated in FIG. 10. The stationary seal ring 154 and the movable seal ring 152 may be similar in design and configuration to the seal 112, as illustrated in FIG. 7. However, for the purpose of ongoing disclosure and better understanding/clarity, the stationary seal ring and the movable seal ring have been annotated with numerals that are different to the numeral 112 that has been mentioned to refer the seal disclosed in FIGS. 1-6.

Referring to FIG. 10, the stationary seal ring 154 may be fixed relative to a stationary (e.g., non-rotating) machine part 158, such as a transmission drive assembly, and movable seal ring 152 may be fixed relative to a movable machine part 157, such as a traction member, (e.g., rotatable) relative to the stationary machine part 158. The seal assembly 150 may further include a first seal retainer/housing 159 configured to partially encapsulate the seal ring 152 and a second seal retainer/housing 155 configured to partially encapsulate the seal ring 154. The assembled combination of the stationary machine part 157, the movable machine part 158, the seal rings 152, 154, the first seal housing 159 and the second seal housing 155 forms a passageway/crevice 148, commonly referred to as a labyrinth. The crevice 148 may be exposed to an ambient environment around the seal assembly 150 and may serve as a passageway for moisture, mud and debris to contact and accumulate around the seal rings 152 and 154.

Referring to FIG. 7, the seal ring 152 may include an inner circumferential surface 160, an outer circumferential surface 162 and a generally annular body 164. The generally annular body 164 extends between the inner circumferential surface 160 and the outer circumferential surface 162. Similarly, seal ring 154 may include an inner circumferential surface 166, an outer circumferential surface 168 and a generally annular body 170. The generally annular body 170 may extend between the inner circumferential surface 166 and the outer circumferential surface 168.

The outer circumferential surface 162 of the seal ring 152 may include a first section 177 and a second section 178. The first section 177 may extend parallel to an axis 202 of the seal ring 152 (as shown in FIG. 7). The second section 178 may extend laterally along the axis 202, to impart a substantially hat-shaped structure to the seal ring 152—although other seal designs/shapes may be possible. In one embodiment, an angle between the first section 177 and the second section 178 may be 90°. In an alternate configuration, angle between the first section 177 and the second section 178 may be greater or lesser than 90°. For example, in one implementation, the angle may take a value in a range of 90° to 110°. In yet another implementation, the outer circumferential surface 162 may have a curved/arcuate profile (for example, a concave shape). In yet another implementation, the outer circumferential surface 162 may be a flat surface. In a similar manner, the outer circumferential surface 168 of the seal ring 154 may include a first section 177' and a second section 178'.

The seal ring 152 also includes a first surface 172, extending perpendicularly to the axis 202, between the inner circumferential surface 160 and the outer circumferential surface 162. Similarly, the seal ring 154 may also include a second surface 174, extending perpendicularly to the axis 202, between the inner circumferential surface 166 and the outer circumferential surface 168. The seal ring 152 may also include a taper surface 180 located adjacent the first surface 172. The taper surface 180 is a surface that is inclined to the first surface 172 by a small angle i.e. 0.5-15 degrees. Similarly, the seal ring 154 may include a taper surface 182 (similar to taper surface 180) located adjacent the second surface 174.

The seal assembly 150 further includes a layer of coating 190 exhibiting hydrophobic and oleophobic properties deposited on at least a portion of the seal rings 152 and 154. For example, the layer of coating 190 may be deposited on the inner circumferential surface 160 and the outer circumferential surface 162, as illustrated in FIG. 7. In an alternate example, the layer of coating 190 may be deposited only over the inner circumferential surface 160, the outer circumferential surface 162, the first surface 172 and the taper band 180. Similarly, the layer of coating 190 may be deposited on the seal ring 154 i.e. on the inner circumferential surface 166 and the outer circumferential surface 168. The layer of coating 190 is made up of a material that exhibits hydrophobic and oleophobic properties i.e. repels oil and water. For example, the layer of coating 190 may be made up of/may include one of a fluorocarbon based material (for example: tri-functional perfluoroalkyl acrylate oligomer, perfluoropolyether poly-acrylate, etc.), hydrocarbon based materials (for example: aluminum oxide nano-particles coated with modified carboxylic acids), ceramic coatings, etc.

As discussed above, the seal assembly 150 may include the crevice 148 that may serve as a passageway for moisture, mud and other water based contaminants to contact the seal ring 152 and 154. The presence of the layer of coating 190 on the seal rings 152 and 154 repels moisture, mud and other contaminants. In doing so, accumulation of moisture, mud and other contaminants on the seal ring 152 and 154 is prevented/delayed. Thus, the layer of coaling 190 protects the seal rings 152 and 154 from the deteriorating influence of the water based contaminants and/or abrasives.

In the embodiment illustrated, the first surface 172 and the second surface 174 engage each other at an interface 176 to form a sealing interface. The interface 176 (i.e. area between the first surface 172 and the second surface 174) may have oil configured to lubricate and help reduce the heat generated between mutually engaging metallic seal rings 152 and 154, thereby, preventing the seal ring 152 and 154 from welding together.

In the embodiment illustrated, in FIG. 8, a portion of the layer of coating 190 deposited over the outer circumferential surface 162 (i.e. on the first section 177 and the second section 178) forms a load bearing receiving surface 184 and a portion of the layer of coating 190 deposited over the outer circumferential surface 168 (i.e. on the first section 177' and the second section 178') forms a load bearing receiving surface 185.

The seal assembly 150 may also include a first load ring 192 disposed on the load bearing receiving surface 184 of seal ring 152, and a second load ring 194 disposed on the load bearing receiving surface 185 of seal ring 154. The first load ring 192 and the second load ring 194 may be formed of a durable and resilient natural or synthetic rubber-like material or elastomer (e.g., nitrile rubber, silicone rubber, etc.), and in use, may be under tension so as to bias seal rings 152 and 154 into pressure engagement at the interface 176.

In an embodiment, as illustrated in FIG. 9, a second layer of coating 200 may be deposited on the seal ring 152 prior to deposition of the layer of coating 190 (the layer of coating 190 hereinafter interchangeably referred to as first layer of coating). Such a configuration results in the second layer of coating 200 lying between the first layer of coating 190 and surface (i.e. inner circumferential surface 160 and/or the outer circumferential surface 162) of the annular body 164. The second layer of coating 200 may be made up of/may include a coating made of one of zinc, manganese phosphate, etc. In an embodiment, the second layer of coating 200 may correspond to the annular body 164 being painted with a colored substance which is subsequently dried to leave a thin decorative or protective coating. In an embodiment, the second layer of coating 200 may be a coating made of a material that offers corrosion protection to the surface (i.e. inner circumferential surface 160 and/or the outer circumferential surface 162) of the annular body 164 (for example, the second layer of coating 144 may correspond to a layer of paint, primer, plating, sealant, top coat, etc.). It may be contemplated, that the seal ring 154 may have the second layer of coating 200 in a similar configuration as describer here for the seal ring 152.

In some implementations, the first layer of coating 190 and the second layer of coating may have a predefined maximum thickness value. For example, the first layer of coating 190 may have a maximum thickness of 20 μm.

In an embodiment, as illustrated in FIG. 10, for enhanced protection from moisture, mud and other contaminants, one or more of the first seal housing 159, the second seal housing 155, the first load ring 190 and the second load ring 192 may also have the layer of coating 190 deposited on them. The layer of coating 190 disposed on the first seal housing 159, the second seal housing 155, the first load ring 190 and the second load ring 192 prevent or delay the build-up of the debris that can eventually displace the load rings 190, 192 and cause failure of the seal assembly 150.

INDUSTRIAL APPLICABILITY

Seal assemblies are generally used to seal a first machine part relative to a second machine part. The seal assemblies may include elastomeric/rubber components and seal rings. The seal rings and elastomeric components may be exposed to oil, mud, and/or water based substances. Because of such exposure, the elastomeric components may absorb oil which may lead to accelerated aging/degradation of the elastomeric components, thereby shortening seal life. Additionally, during operation of a work machine mud/earthen materials/debris may cling to components of the seal assemblies. The mud/earthen materials/debris may forcibly enter into such seal assemblies and may displace the elastomeric components, causing gaps to develop thereby causing oil leaks and subsequent failures. Moreover, due to the oil leakage the seal ring may be covered by oil. Hard abrasives from the mud/earthen materials may stick/cling to the oil on the metal seal ring and if ingested between contacting faces, accelerate wear.

In an aspect of the present disclosure, as illustrated in FIG. 2, the seal 112 used in the joint assembly 106 is disclosed. The seal 112 includes the body having inner surface 126 and outer surface 128. The inner surface 126 and the outer surface 128 have the layer of coating 132 disposed over them. The layer of coating 132 is made up of material that exhibits oleophobic and hydrophobic properties i.e. properties of repelling oil and water. Such a seal having the layer of coating 132 on the inner surface 126 repels oil/lubricant that accumulates on the seal 112, thus, acting as a shield against oil/lubricant. Hence, the layer of coating 132 reduces the probability of leakage of oil from the reservoir 118.

Further, as discussed above, the layer of coating 132 may be deposited/disposed over the rubber/elastomeric components such as the load ring 113, the thrust ring 111 and/or sealing lip 123. Since the layer of coating 132 exhibits oleophobic properties the oil that accumulates around/on the rubber/elastomeric components such as the load ring 113, the thrust ring 111 and/or sealing lip 123 is repelled. This avoids absorption of oil by the rubber/elastomeric components which otherwise would have led to reduced frictional forces to develop between adjoining components (for example, elastomeric components and seal rings) that would have caused the elastomeric components to become displaced. Thus, the layer of coating 132 as disclosed in the present disclosure prevents displacement of sealing components thereby avoiding seal failure.

Further, the layer of coating 132 on the outer surface 128 reduces the probability of earthen particles/contaminants from entering the joint assembly 106 that may cause the seal 112 and load ring 113 to deteriorate at a faster than normal rate. For example, the hydrophobic nature of the layer of coating 132 prevents accumulation of mud, water based contaminants on the layer of the coating 132 deposited over the outer surface 128 of the seal 112. Since the layer of coating 132 prevents accumulation of mud, water based contaminants on the seal 112, the mud/earthen materials may not be able to enter the seal assemblies/joint assembly 106. Accordingly, the mud/earthen materials would not be able to displace the elastomeric components and cause oil leaks and subsequent failures. Further, the oleophobic property of the layer of coating 132 disposed over the outer surface 128 prevents oily substrates from accumulating on the seal 112. The presence of minimal/no oil on the layer of coating 132 prevents hard abrasive particles, capable of promoting deterioration of the seal 112, from clinging to the surface of the seal 112. Thus, such a coating prolongs seal 112 and load ring's 113 life.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A seal comprising:
   a body defining an inner surface and an outer surface; and
   a layer of coating deposited on the body, the layer of coating including a material exhibiting oleophobic and hydrophobic properties for both the inner and outer surfaces, wherein the layer of coating is a first layer of coating, the seal further including a second layer of coating between the surface and the first layer of coating.

2. The seal of claim 1 wherein the layer of coating forms a sealing surface of the seal.

3. The seal of claim 1 wherein the second layer of coating is a coating made of one of zinc, manganese phosphate, primer material and paint.

4. The seal of claim 1 wherein the second layer of coating is a layer of powdered coating.

5. The seal of claim 1 wherein the layer of coating includes one of a sol-gel, fluorocarbon based material, hydrocarbon based materials and ceramic coatings.

6. The seal of claim 1 wherein the seal is a seal ring of one of a track seal, duo-cone seal, elastomeric face seal, and metal face seal.

7. The seal of claim 1 wherein the layer of coating has a thickness of less than 20 μm and provides a flexible coated surface.

8. A seal assembly comprising:
   a seal ring defining an outer circumferential surface and an inner circumferential surface; and
   a layer of coating deposited on the outer circumferential surface and the inner circumferential surface, the layer of coating including a material exhibiting oleophobic and hydrophobic properties, wherein the layer of coating is a first layer of coating, the seal assembly further including a second layer of coating between the outer circumferential surface and/or the inner circumferential surface, and the first layer of coating.

9. The seal assembly of claim 8 wherein a portion of the layer of coating above the inner circumferential surface forms a sealing surface.

10. The seal assembly of claim 8 wherein a portion of the layer of coating above the outer circumferential surface forms a load ring receiving surface.

11. The seal assembly of claim 10 further comprising a load ring disposed on the load ring receiving surface.

12. The seal assembly of claim 8 wherein the second layer of coating is a coating made of one of zinc, manganese phosphate, primer material and paint.

13. The seal assembly of claim 8 wherein the layer of coating includes one of a sol-gel, fluorocarbon based material, hydrocarbon based materials and ceramic coatings.

14. The seal assembly of claim 8 wherein the layer of coating has a thickness of less than 20 nm and provides a flexible coated surface.

15. The seal assembly of claim 8 further comprising a seal housing configured to partially encapsulate the seal ring.

16. The seal assembly of claim 15 wherein the layer of coating is deposited on the seal housing.

* * * * *